United States Patent
Tsai

(10) Patent No.: US 12,333,774 B2
(45) Date of Patent: Jun. 17, 2025

(54) METHOD FOR OPTIMIZING THE IMAGE PROCESSING OF WEB VIDEOS, IMAGE PROCESSING APPARATUS APPLYING THE METHOD

(71) Applicant: HON HAI PRECISION INDUSTRY CO., LTD., New Taipei (TW)

(72) Inventor: Tsung-Hsien Tsai, Kaohsiung (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 469 days.

(21) Appl. No.: 17/868,217

(22) Filed: Jul. 19, 2022

(65) Prior Publication Data
US 2023/0028497 A1    Jan. 26, 2023

(30) Foreign Application Priority Data
Jul. 22, 2021    (CN) .......................... 202110833296.5

(51) Int. Cl.
*G06V 10/25* (2022.01)
*G06V 10/94* (2022.01)
*H04N 1/00* (2006.01)

(52) U.S. Cl.
CPC .............. *G06V 10/25* (2022.01); *G06V 10/94* (2022.01); *H04N 1/00209* (2013.01)

(58) Field of Classification Search
None
See application file for complete search history.

(56) References Cited

U.S. PATENT DOCUMENTS

| | | | |
|---|---|---|---|
| 9,459,936 | B2 | 10/2016 | Fallows et al. |
| 9,794,304 | B2 | 10/2017 | Fallows et al. |
| 10,148,705 | B2 | 12/2018 | Fallows et al. |
| 10,686,850 | B2 | 6/2020 | Fallows et al. |
| 11,231,376 | B2 | 1/2022 | Chen et al. |
| 2012/0321135 | A1* | 12/2012 | Amemiya .......... G06V 10/7515 382/103 |
| 2019/0197680 | A1* | 6/2019 | Sakai ...................... H01L 22/12 |

FOREIGN PATENT DOCUMENTS

| | | |
|---|---|---|
| CN | 102893270 A | 1/2013 |
| TW | 202109701 A | 3/2021 |

* cited by examiner

*Primary Examiner* — Dov Popovici
(74) *Attorney, Agent, or Firm* — ScienBiziP, P.C.

(57) ABSTRACT

A method of improving an efficiency of forming the golden samples obtains an image with a chip. Position information of the chip in the image is obtained based on the image. A target region on the image is labeled based on the position information. The target region is a region of the image covered by the chip. The target region is cut from the image to obtain a golden sample. An image process apparatus is also provided.

12 Claims, 5 Drawing Sheets

METHOD FOR OPTIMIZING THE IMAGE PROCESSING OF WEB VIDEOS, IMAGE PROCESSING APPARATUS APPLYING THE METHOD

FIELD

The subject matter herein generally relates to image processing, particularly to web video processing, a method for optimizing the image processing of web videos, an image processing apparatus, and a storage medium applying the method.

BACKGROUND

During manufacturing of integrated circuit (IC) chips, manufacturers need to check an appearance of the IC chips for ensuring a quality of the IC chip. Artificial Intelligence (AI) technology can be used for checking the appearance of the IC chip. An AI model is provided for training or comparing sample images. The sample images are considered as golden samples. For forming the golden samples, positions of the IC chips need to be placed in a suitable position for obtaining the golden samples. An image process is executed for processing the image of the target region of the IC chip. The process of forming the golden samples is complex and time consuming.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. It needs to be indicated that in case of no conflict, the embodiments of the present application and the features in the embodiments can be combined with one another. The embodiments to be described are merely a part rather than all of the embodiments of the present invention.

Figure 1:
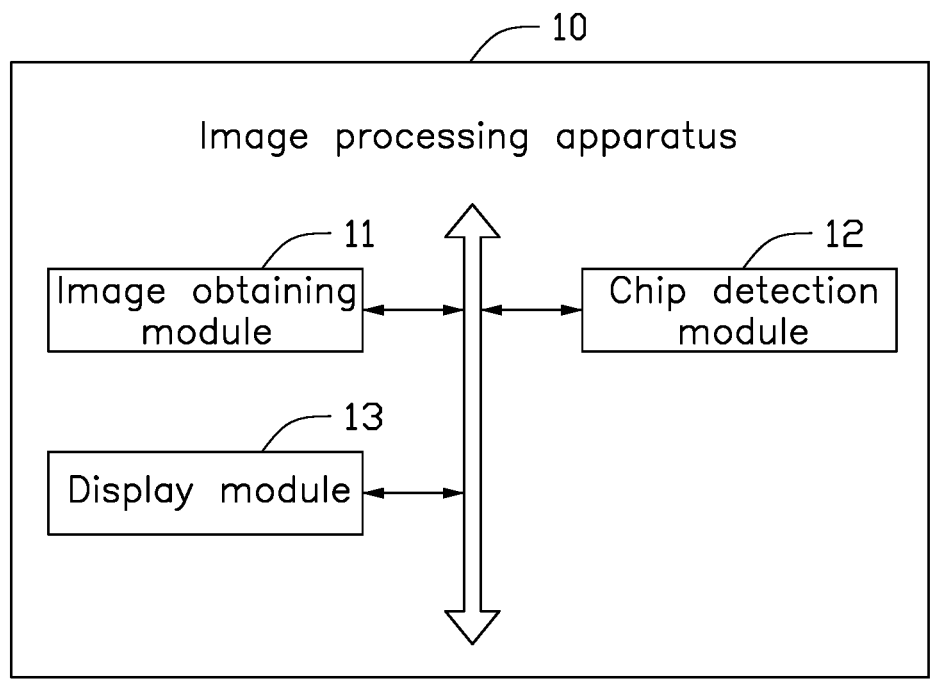
FIG. 1 is a diagram illustrating a first embodiment of an image processing apparatus according to the present disclosure.

FIG. 1 shows a first embodiment of image processing apparatus 10.

As shown in FIG. 1, the image processing apparatus 10 includes a storage medium 101 and a processor 102. The storage medium 101 comprises an image obtaining module 11, a chip detection module 12, and a display module 13, which are connected with each other through a bus, or directly connected. The storage medium 101 stores computer programs, which are executed by the processor 102 to implement functions of the above modules.

The storage medium 101 is an internal storage of the image processing apparatus 10, which is embedded in the image processing apparatus 10. In other embodiments, the storage medium 101 can be an external storage medium, which is coupled to the image processing apparatus 10. In some embodiments, the storage medium 101 stores computer programs and various data. The storage medium 101 realizes high speed and automatic access of the program or data during operations on the image processing apparatus 10. The storage medium 101 can be a random-access storage medium, or a non-volatile storage, such as a hard disk, a memory, a plug-in hard disk, a smart media card (SMC), a secure digital (SD), a flash card, a disk storage component, a flash component, or other volatile solid memory.

The processor 102 can be a central processing unit (CPU), or other universal processor, such as a digital signal process (DSP), an application specific integrated circuit (ASIC), a field-programmable gate array (FPGA), or other programmable logic component, discrete gate or transistor logic, discrete hardware components, and so on. The universal processor can be a microprocessor or the at least one processor can be any regular processor, or the like.

In one embodiment, the image obtaining module 11 is configured to obtain an image, and transmits the obtained image to the chip detection module 12 and the display module 13. In one embodiment, the image obtaining module 11 firstly captures the image with a chip through a camera. Then, the image obtaining module 11 transmits the obtained image to the chip detection module 12 and the display module 13 through a WebSocket protocol.

The WebSocket protocol is a full-duplex communication protocol based on transmission control protocol (TCP), which allows a server to actively push data to clients, for achieving a full-duplex communication between a browser and the server. In one embodiment, the image obtaining module 11 transmits the obtained image through the WebSocket protocol, thus resources and a bandwidth of the server can be saved, and a communication in timely fashion can be achieved.

In another embodiment, before transmitting the obtained image, the image obtaining module 11 further determines a connection between the chip detection module 12 or the display module 13 is effective. For example, the image obtaining module 11 analyses identification information of the client (the chip detection module 12 or the display module 13) from a connected parameter (such as a name or an address of the client) for determining whether the connection of client is a repeating connection. When the connection of the client is the repeating connection, the client has an effective connection, the current connection is redundant. The image obtaining module 11 cuts off the current connection to reduce a waste of resources. When the connection of the client is a new connection, it is the current connection which is effective, the image obtaining module 11 maintains the current connection.

In another embodiment, the image obtaining module 11 detects a working state of the camera for determining whether the connection of the client is a repeating connection. For example, when the camera is in a working state (for example, the camera is shut down or not connected to a network), the connection of the client is ineffective, the image obtaining module 11 cuts off the connection, and controls the camera to switch to the working state (for example, the camera is restarted or reconnected to the network), or send a notice to a user that the camera abnormally works (the camera is not in the working state). When the camera is in the working state, the current connection is effective, the image obtaining module 11 maintains the current connection.

In one embodiment, before transmitting the obtained image, the image obtaining module 11 further pre-processes the obtained image. The operation of pre-processing can be resizing or compressing. The image obtaining module 11 can resize the obtained image in a predefined resize ratio.

For example, in one embodiment, the image obtaining module 11 captures a first image with the chip by the camera. A size of the first image is in 2448*2048. The image obtaining module 11 resize in the first image based on the predefined resize ratio to obtain a second image. When the predefined resize ratio is 0.5*0.5, a size of the second image is 1224*1024. In another embodiment, the image obtaining module 11 coverts the image into byte stream data for compressing the image. A storage space of the image is reduced, and resources of the server are reduced.

In one embodiment, the chip detection module 12 is configured to receive the image, detect a position of the chip in the image, and transmit position information of the detected chip to the display module 13. In one embodiment, the chip detection module 12 can identify the position of the chip in the image by features, and transmits the position information to the display module 13 through a server-sent event (SSE).

The SSE is a one-way transmission path based on a hypertext transfer protocol (HTTP). The SSE allows the server to push information to the browser, and a webpage automatically accesses updates from the server. In one embodiment, the chip detection module 12 transmits the position information to the display module 13 through the SSE, thus the position information is synchronized to the display module 13 in time.

Figure 2:
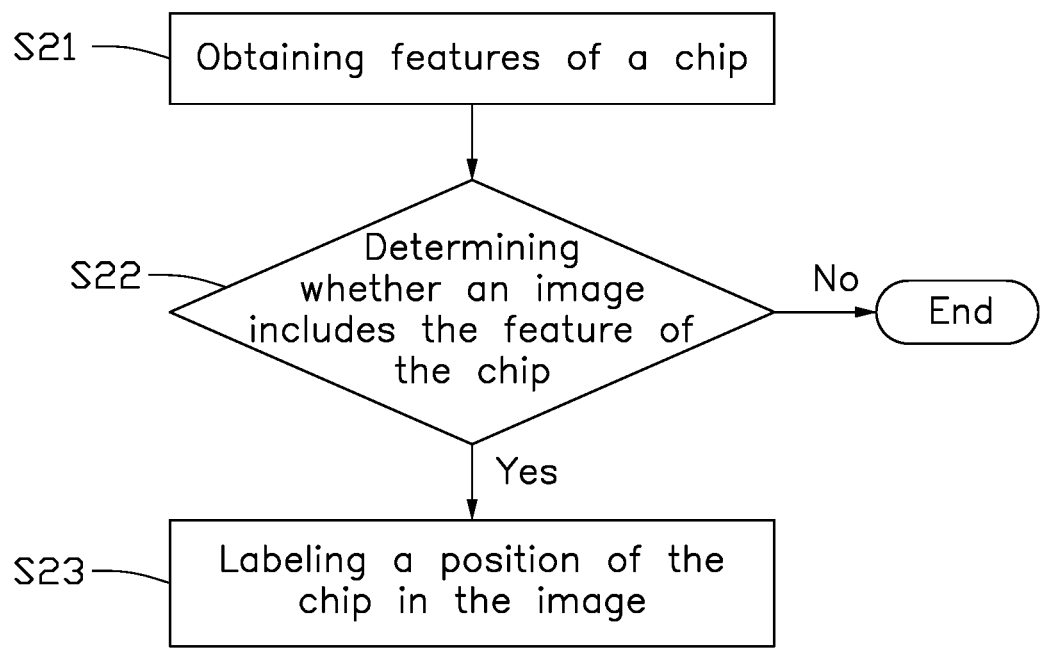
FIG. 2 is a flowchart illustrating a first embodiment of a method of improving an efficiency of forming the golden samples according to the present disclosure.

FIG. 2 shows a flowchart of a method of processing images.

As shown in FIG. 2, the step of identifying the position of the chip in the image by features includes:

In block S21, features of the chip are obtained.

In one embodiment, the chip detection module 12 obtains the features of the chip based on a predefined information or historical data. The features can include appearance features or identifier features. The appearance features can include at least one of shape, size, color, texture, not being limited. The identifier features can include at least one of text, number, letter, image identifier, not being limited. For example, the chip detection module 12 can receive the predefined information input by user. The predefined information includes the features of the chip. Otherwise, the chip detection module 12 can extract features of the chip from the historical data of the chip detection.

In block S22, whether the image with the chip includes the features is determined.

In one embodiment, the chip detection module 12 scans the image with the chip for confirming whether the image with the chip includes the features. For example, the chip detection module 12 scans the text, the number, or the letter of the image for identifying a model of the chip. When the chip detection module 12 identifies the model of the chip from the image, the position of the chip needs to be labeled. When the chip detection module 12 fails to identify the model of the chip, the image fails to meet a sample requirement, another image can be received or the image obtaining module 11 re-obtains the image with the chip.

When the image with the chip includes the features, the procedure goes to block S23.

When the image with the chip is without the features, the procedure ends.

In block S23, a position of the chip in the image is labeled.

In one embodiment, the chip detection module 12 can establish a coordinate system based on the image for labeling the position of the chip in the image. For example, a pixel in the image serves as a point of origin, and two directions being perpendicular to each other serve as a horizontal axis and a vertical axis respectively. A fixed number of the pixels serves as a unit, thus a rectangular coordinates system based on such units is established. The chip detection module 12 draws an outline of the chip in the rectangular coordinates, and labels coordinates of points on the outline. A set of the coordinates of the points represents the position of the chip in the images.

In one embodiment, the chip detection module 12 also transmits the position information to the display module 13. The position information can include the set of the coordinates of the points and the information of the rectangular coordinates system.

In one embodiment, the display module 13 receives the image and the position information, reconstructs the outline of the chip, and displays the reconstruction output line of the chip. Based on the outline of the chip displayed on the display module 13, a target region with the chip in the image is easily identified and cut. The target region is a region of the image with the chip.

In one embodiment, after displaying the reconstruction outline of the chip, the display module 13 cuts the image or sends a notice to a user to cut the image, for obtaining golden samples.

In another embodiment, the display module 13 identifies the position of the chip in the image by the features, so as to determine whether the chip is in the target region. When the chip is in the target region, the display module 13 sends a request to the image obtaining module 11 for obtaining the image captured by the image obtaining module 11. When the chip is outside of the target region, the display module 13 sends an instruction to the image obtaining module 11 for controlling the image obtaining module 11 to re-obtain the image of the chip.

The display module 13 can identify the position of the chip in the image by the features, the detailed description is recited in above blocks S21-S23.

Figure 3:
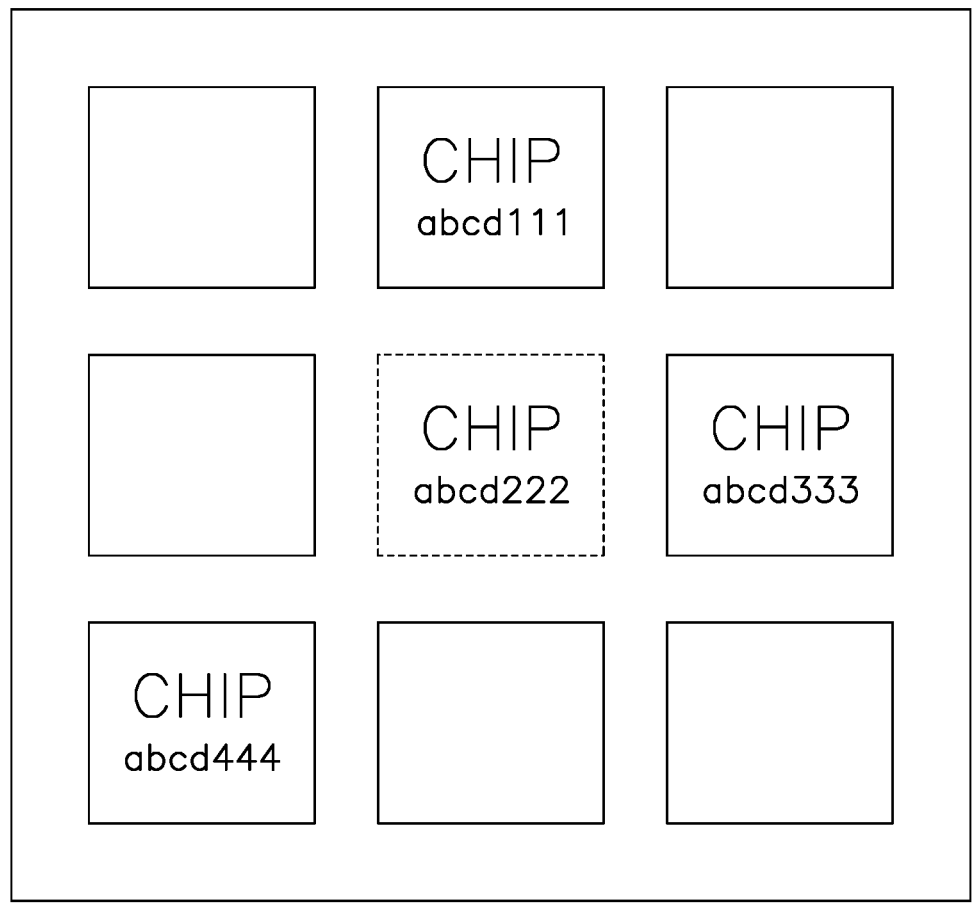
FIG. 3 is a diagram illustrating an embodiment of an image display interface according to the present disclosure.

As shown in FIG. 3, the display module 13 displays the outline of the chip with the model "abcd222". A cutting operation can execute along the outline of the chip, and the image inside the target region remains, which serves as the golden sample of the chip.

In one embodiment, the display module 13 sends the request to the image obtaining module 11 through a RESTful application programming interface (API) for obtaining the image with the chip.

The RESTful API is a representational state transfer (REST) of the API. The RESTful API is a type of HTTP protocol. In construction of the RESTful, data and functions serve as resources, which are accessed using a uniform resource identifier (URI) and executed by predefined operations. The client and the server exchanges expressions of the resources. For example, text resources are exchanged in one format of Hyper Hex Markup Language (HTML), Extensible Markup Language (XML), or JavaScript Object Notation (JSON), and the like. The image resources are exchanged in one format of Portable Network Graphics (PNG), or Joint Photographic Experts Group (JPEG), and the like.

In one embodiment, the display module 13 sends request to the image obtaining module 11 through the RESTful API. The image obtaining module 11 uses one unified response interface to receive all requests, without defining different response interfaces for requests in different formats.

Figure 4:
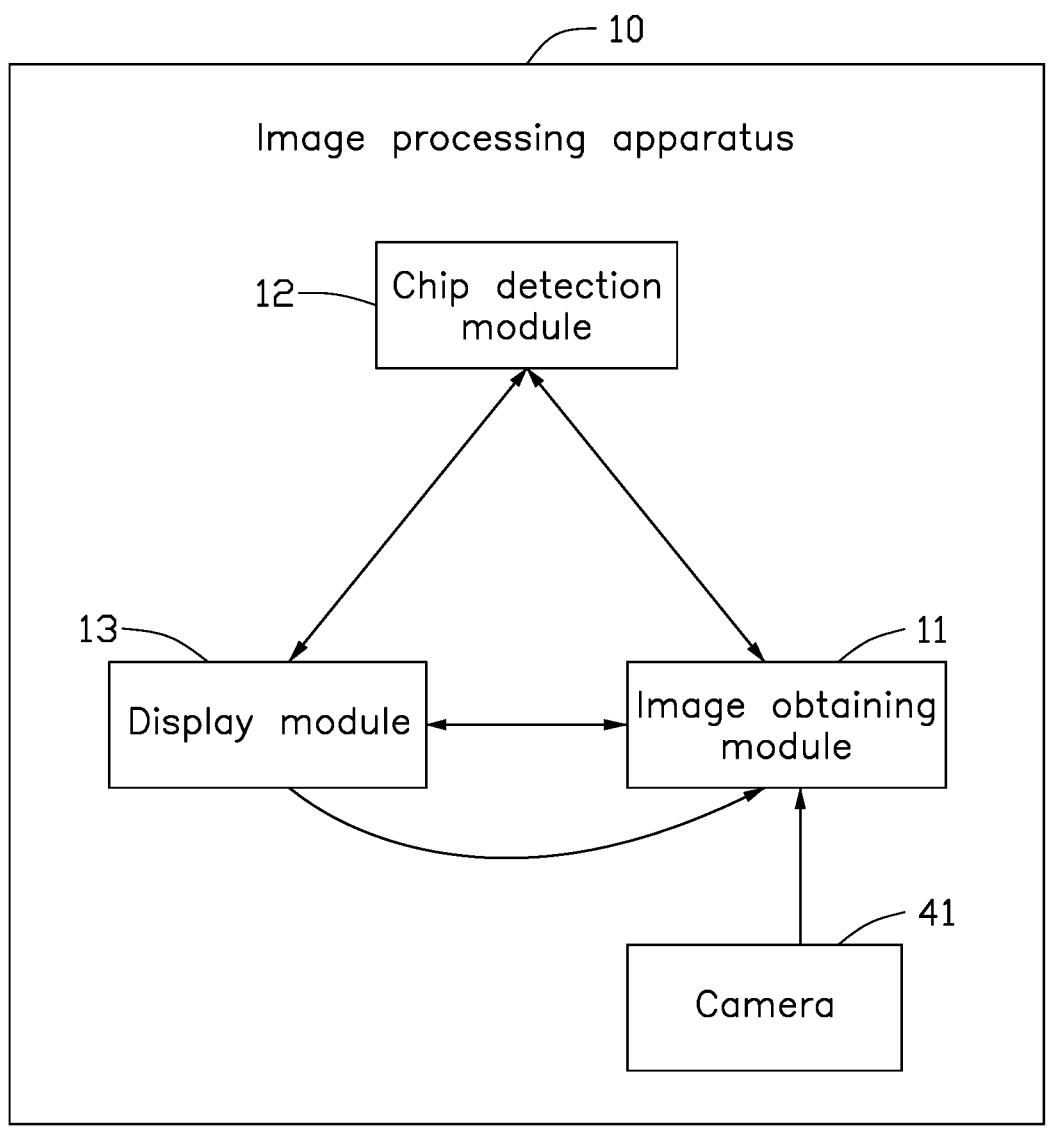
FIG. 4 is a diagram illustrating a second embodiment of an image processing apparatus according to the present disclosure.

FIG. 4 shows a second embodiment of the image processing apparatus 10.

As shown in FIG. 4, the image obtaining module 11, the chip detection module 12, and the display module 13 are respectively mounted on three host computers, which are communicating with each other through local area network (LAN). The image obtaining module 11 further connects with the camera 41. A tray for receiving the chip is under a lens of the camera 41. The display module 13 can display the image captured by the camera 41 and the outline of the chip at the same time, cuts the image along the outline of the chip for obtaining the golden sample of the chip.

The host computer can be a computer, a tablet computer, a server, or a workstation, and also can be a micro controller, a processor, or an integrated circuit with specified applications.

In one embodiment, the image obtaining module 11, the chip detection module 12, and the display module 13 are respectively embedded on the three host computers, thus computing resources are spread out and dispersed, and efficiency of the data processing is improved.

Figure 5:
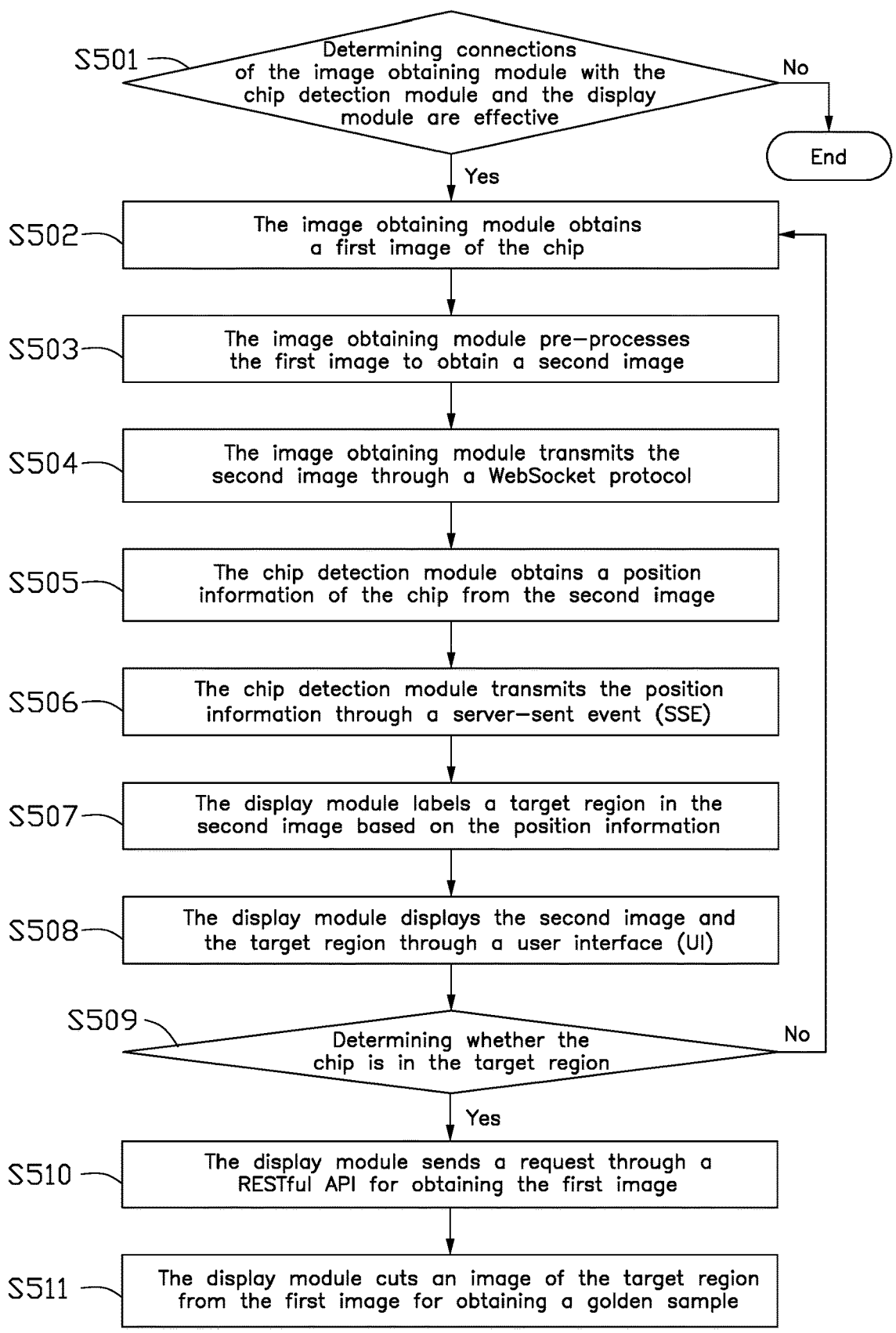
FIG. 5 is a flowchart illustrating a second embodiment of a method of forming the golden samples according to the present disclosure.

FIG. 5 shows a second embodiment of the method of processing images. The image obtaining module 11, the chip detection module 12, and the display module 13 in the method can reference the above descriptions.

As shown in FIG. 5, the method includes the following steps. These steps may be re-ordered:

In block S501, the image obtaining module 11 determines that connections of the image obtaining module with the chip detection module 12 and the display module 13 are effective.

When the connections of the image obtaining module with the chip detection module 12 and the display module 13 are effective, the procedure goes to block S502.

When the connections of the image obtaining module with the chip detection module 12 and the display module 13 are not effective, the procedure ends.

The image obtaining module 11 determines whether the connections of the image obtaining module with the chip detection module 12 and the display module 13 are effective, when the connections of the image obtaining module with the chip detection module 12 and the display module 13 are effective, the image obtaining module 11 obtains a first image and a second image, which are transmitted to the chip detection module 12 and the display module 13. When the connections of the image obtaining module with the chip detection module 12 and the display module 13 are not effective, the image obtaining module 11 re-checks the connections of the image obtaining module with the chip detection module 12 and the display module 13 or sends a notice to a user for warning as to the abnormal connection.

In block S502, the image obtaining module 11 obtains the first image with the chip.

The image obtaining module 11 can capture the first image with the chip through the camera, thus the first image is obtained.

In block S503, the image obtaining module 11 pre-processes the first image to obtain the second image.

The operation of pre-processing can be resizing or compressing. The image obtaining module 11 can resize in the obtained image in a predefined resize ratio. The image obtaining module 11 also can covert the image into byte stream data for compressing the image.

In block S504, the image obtaining module 11 transmits the second image through a WebSocket protocol.

The image obtaining module 11 can transmit the second image to the chip detection module 12 and the display module 13 through the WebSocket protocol.

In block S505, the chip detection module 12 obtains position information of the chip from the second image.

The chip detection module 12 can obtain the position information of the chip from the second image by features for obtaining the position information.

In block S506, the chip detection module 12 transmits the position information through a server-sent event (SSE).

The chip detection module 12 transmits the position information to the display module 13 through the SSE.

In block S507, the display module 13 labels a target region in the second image based on the position information.

The target region is a region of an image covered by the chip. The display module 13 reconstructs an outline of the chip based on the position information and displays the outline of the chip on the second image.

In block S508, the display module 13 displays the second image and the target region through a user interface (UI).

The display module 13 can display the second image and the target region through the UI of a browser.

In block S509, the display module 13 determines whether the target region includes the chip.

When the chip is in the target region, the procedure goes to S510.

When the chip is not in the target region, the procedure goes to S502.

In one embodiment, the display module 13 detects the position of the chip on the second image through a feature identifying manner. When the chip is in the target region, the display module 13 can send a request to the image obtaining module 11 for obtaining the first image from the image obtaining module 11. When the chip is outside of the target region, the display module 13 can send an instruction to the image obtaining module 11 for controlling the image obtaining module 11 to re-obtain the first image with the chip.

In block S510, the display module 13 sends the request through a RESTful API for obtaining the first image.

The display module 13 sends the request to the image obtaining module 11 through the RESTful API. The image obtaining module 11 receives and responds to the request, transmitting the first image to the display module 13.

In block S511, the display module 13 cuts the target region of the image from the first image for obtaining a golden sample.

The image of the target region is part of image covered by the chip in the first image. The display module 13 cuts the first image along the outline of the chip, leaving the target region of the image, which serves as the golden sample of the chip.

In the present disclosure, by the interacting between the image obtaining module 11, the chip detection module 12, and the display module 13, the image captured by the camera in time and the target region with the chip are displayed at the same time. The operation of cutting the target region of the chip in the captured image is more convenient, an efficiency of forming the golden sample is improved, and period for checking an appearance of the chip is reduced.

It should be noted that the above embodiments are only for explaining the technical solutions of the present disclosure, and the above embodiments are not intended to be limiting.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An image processing apparatus, the image processing apparatus comprises an image obtaining module, a chip detection module, and a display module; the display module electrically connects with the image obtaining module and the chip detection module; the image obtaining module electrically connects with the chip detection module; wherein the image obtaining module is configured to obtain an image with a chip, and transmit the image to the chip detection module and the display module; the chip detection module is configured to receive the image, obtain position information of the chip based on the image, and transmit the position information to the display module; the display module is configured to receive the image and the position information, label a target region on the image based on the position information, and cut the target region from the image to obtain a golden sample; wherein the target region is a region of the image of the chip and is covered by the at least one chip; the target region is cut based on an outline of the chip; and the chip detection module transmits the position information through a server-sent event.

2. The image processing apparatus of claim 1, wherein the image is transmitted through WebSocket protocol.

3. The image processing apparatus of claim 2, wherein before transmitting the image, the image obtaining module further determines whether connections of the image obtaining module with the chip detection module and the display module are effective; when the connections of the image obtaining module with the chip detection module and the display module are not effective, the operation of transmitting the image is terminated, and the image obtaining module sends a notice to a user or re-checks the connections.

4. The image processing apparatus of claim 2, wherein before transmitting the image, the image obtaining module further pre-processes the image; the operation of the pre-processing comprises resizing or compressing of the image.

5. The image processing apparatus of claim 1, wherein the chip detection module obtains features of the chip, and determines whether the image comprises the features; when the image comprises the features, a position of the chip in the image is labeled to obtain position information.

6. The image processing apparatus of claim 1, wherein the display module sends a request through a representational state transfer (REST) application programming interface (API) for receiving the image.

7. A method used in an image processing apparatus, the image processing apparatus comprises:
a storage medium; and
a processor,
wherein the storage medium stores computer programs, and
the processor executes the computer programs to implement the following:
obtaining an image with a chip;
obtaining position information of the chip in the image based on the image;
labeling a target region on the image based on the position information; wherein the target region is a region of the image covered by the chip; and
cutting the target region from the image to obtain a golden sample;
wherein the target region is a region of the image with the chip, and is covered by the at least one chip; the target region is cut based on an outline of the chip; and
the position information is transmitted through a server-sent event.

8. The method of claim 7, wherein the image is transmitted through WebSocket protocol.

9. The method of claim 8, wherein the image processing apparatus further comprises an image obtaining module, a chip detection module, and a display module; the processor further:
determining whether connections of the image obtaining module with the chip detection module and the display module are effective;
terminating an operation of transmitting the image, and sending a notice to a user or re-checking the connections, when the connections of the image obtaining module with the chip detection module and the display module are not effective.

10. The method of claim 8, wherein the processor further:
pre-processing the image; wherein the operation of the pre-processing comprises resizing or compressing of the image.

11. The method of claim 7, wherein the processor further:
obtaining features of the chip;
determining whether the image comprises the features; and
labeling a position of the chip in the image to obtain position information, when the image comprises the features.

12. The method of claim 7, wherein the processor further:
sending a request through a representational state transfer (REST) application programming interface (API) for receiving the image converting the information of the image in a first object into a second object.

* * * * *